No. 645,050. Patented Mar. 6, 1900.
A. GARBEIL.
MACHINE FOR MAKING BUTTONS.
(Application filed Dec. 21, 1899.)
(No Model.)
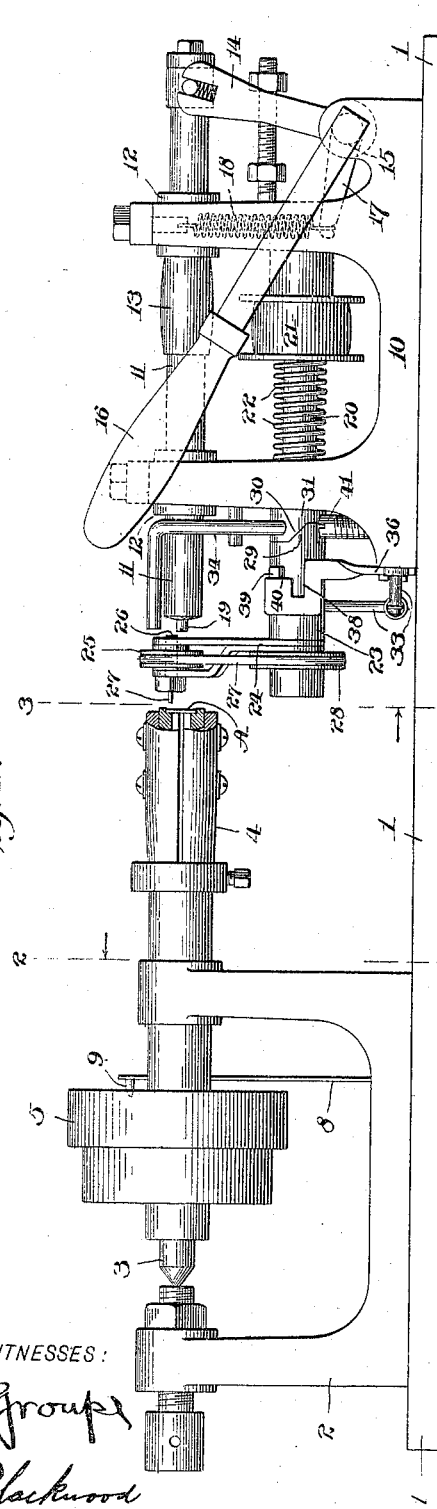
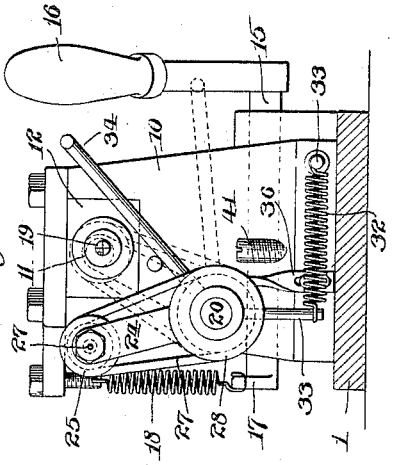
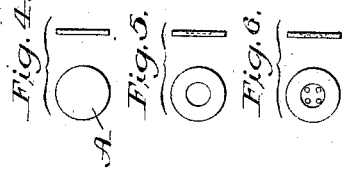
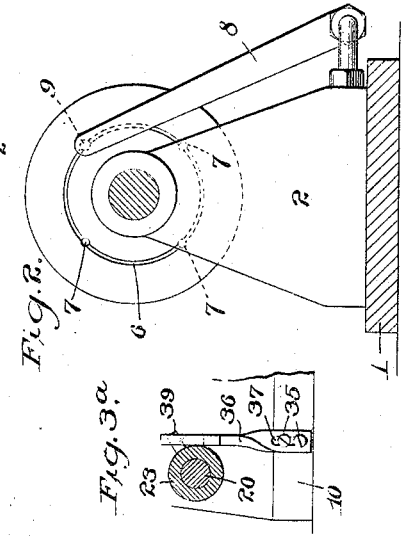
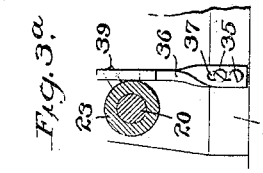
WITNESSES:
A. V. Groupp
H. D. Blackwood
INVENTOR
Abraham Garbeil
BY John B. Nolan
ATTORNEY
THE NORRIS PETERS CO., PHOTO-LITHO., WASHINGTON, D. C.

UNITED STATES PATENT OFFICE.

ABRAHAM GARBEIL, OF PHILADELPHIA, PENNSYLVANIA, ASSIGNOR TO GARBEIL BROS., OF SAME PLACE.

MACHINE FOR MAKING BUTTONS.

SPECIFICATION forming part of Letters Patent No. 645,050, dated March 6, 1900.

Application filed December 21, 1899. Serial No. 741,089. (No model.)

*To all whom it may concern:*

Be it known that I, ABRAHAM GARBEIL, a citizen of the United States, residing at the city and county of Philadelphia, in the State of Pennsylvania, have invented certain new and useful Improvements in Machines for Making Buttons, of which the following is a full, clear, and exact description, reference being had to the accompanying drawings, forming a part of this specification.

Heretofore in the manufacture of perforated buttons of mother-of-pearl, horn, and similar material it has been the custom to turn the central recess or depression in the circular disk or blank on a "centering-machine" and then to transfer such disk or blank to a separate and independent machine for the purpose of drilling therein the series of relatively-arranged perforations.

The object of my invention is to provide a unitary structure whereby both the "centering" and the drilling of the disk may be expeditiously effected; and to this end the invention embodies novel features of construction and combinations of parts, which will be hereinafter particularly described and claimed.

In the drawings, Figure 1 is a side elevation, partially in section, of my improved machine in its preferred form. Fig. 2 is a vertical section, as on the line 2 2 of Fig. 1. Fig. 3 is a similar section, as on the line 3 3 of Fig. 1, looking toward the centering and drilling mechanisms. Fig. 3ª is a sectional detail of the vertically-adjustable bracket with which the cam-actuated sleeve engages. Fig. 4 represents the blank in front and edge elevation. Fig. 5 is a similar representation of the same as centered. Fig. 6 illustrates the button as completed.

1 is the bed-plate of the machine, 2 the head-stock, and 3 the spindle in the latter. This spindle is equipped with the usual chuck 4, by which the blank-disk A is detachably held. It is also furnished with a wheel or pulley 5, by means of which the chuck may be rotated. The face of the wheel or pulley is provided with a concentric groove 6, which is interrupted at certain intervals by a series of sockets 7, there being in the present instance four. Secured to the head-stock is the lower end of a spring-pawl 8, the upper or free end of which lies adjacent to the grooved face of the wheel and includes in its construction a laterally-disposed stud 9, which engages with the groove or channel 6 and during the rotation of the wheel registers with the sockets in succession, so as thereby to stop the wheel at regular intervals in its rotation. Usually the wheel is intermittently rotated by hand, the degree of the strokes or turns being determined by the coöperation of the pawl with the relatively-arranged sockets. The devices thus far described are those commonly used in button-turning machines. I may remark, however, that any other suitable mechanism for holding and intermittently turning the blank may be employed without affecting my invention.

10 is the tail-stock, mounted on the bed-plate in proper relation to the head-stock and provided with the spindle 11 in axial alinement with the chuck-carrying spindle 3. The spindle 11 is slidingly fitted to its bearings 12, so as to be movable toward and from the work-holding chuck, and it is provided with a pulley 13, around which passes a driving-belt. This spindle is connected by a pin-and-slot connection with an arm 14 on a transverse rock-shaft 15, which has its bearings in the base of the tail-stock, and is provided at its forward end with a handle-arm 16, by the forcible depression of which the spindle 11 may be bodily moved toward the work in the chuck. On the opposite end of the rock-shaft is an arm 17, to which is secured the lower end of a retracting-spring 18; the upper end of which is fastened to an overhanging lug on the tail-stock, whereby the said rock-shaft is held yieldingly in a position to maintain the spindle 11 normally retracted from the chuck. On the inner end of this spindle is a suitable bit or tool 19, which is designed when the spindle is moved forward to turn a central socket or recess in the blank-disk in the chuck.

Mounted in suitable bearings in the standards of the tail-stock, in rear of and below the spindle 11 and parallel therewith, is a shaft 20, on which is fixed a pulley 21, around which passes a driving-belt. This shaft is longitudinally movable in its bearings, being held normally retracted by means of a spring 22, which, encircling the shaft, bears at its end against one of the standards of the tail-stock and against the opposing face of the pulley 21, respectively. On that portion of the shaft adjacent the tool-carrying end of the spindle 11 is loosely fitted a sleeve 23, from the outer end of which rises an arm 24, the upper portion of which is bifurcated for the reception of a grooved pulley 25, the shaft 26 of which is journaled in the limbs of said arm. This pulley is geared by means of a belt 27 with a larger pulley 28, fast on the end of the shaft 20, whereby the motion is transmitted from the latter to the shaft 26. Extending centrally from the outer end of the latter shaft is a boring-bit 27, which is designed to be so set in relation to the button-blank in the chuck as to drill the perforations in the blank.

The inner end of the sleeve is provided with a beveled projection or cam portion 29, which normally registers with a correspondingly-shaped recess or cam 30 in the opposing end of a collar 31, loosely mounted on the shaft 20, contiguous to the inner standard of the tail-stock, the normal registry of the cam-surfaces being effected by the action of the retracting-spring 22. Normally the arm carrying the pulley 25 is upright, or substantially so, the sleeve with the interlocking collar being held in proper position by the action of a spring 32, which is secured to studs 33 33 on said sleeve and on the base of the tail-stock, respectively.

Extending forwardly and upwardly from the "cam-collar," as it may be termed, is an arm or handle 34, by the forcible depression of which said collar may be partially turned on its shaft.

Affixed to the base of the tail-stock by means of screws 35 is a bracket 36, which extends adjacent to the sleeve. These screws pass through a vertical slot 37 in the bracket, so as to enable the bracket to be vertically adjusted as desired. This bracket is provided in its upper portion with a horizontal offset or guideway 38, and the sleeve is provided with a suitably-located stud 39, which is adapted to coact with said offset or guideway when the interlocked collar and sleeve are swung forward as a unit, to the end that in the further forward movement of said collar the coacting cam-surfaces will effect the longitudinal movement of the sleeve, its connections, and the shaft 20 in opposition to the compression of the spring 22. When the handle 34 is released, the said parts will be returned to their normal position by the expansion of the spring. The said stud during the rotation of the sleeve impinges against the vertical edge 40 of the bracket, so as to maintain the locking of the sleeve and collar together until the stud engages with the offset or guideway in said bracket.

The relative positions of the several parts are such that when the spindle 11 is in its normal or retracted position there will be no interference thereby with the forward movement of the swinging arm 24 and that when said arm is swung forward the boring-bit 27 on the shaft 26 will be slightly eccentric to the axis of the work-holding chuck. (See dotted lines, Fig. 3.) The degree of eccentricity may be varied by adjusting the bracket 36 vertically, so as to shift the horizontal abutment for the stud 39 on the sleeve, and the extent of longitudinal movement of said sleeve and its connections may be regulated by varying the throw of the arm 34—as, for example, by the vertically-adjustable screw stop or abutment 41 in the base of the tail-stock.

The operation of the machine may be briefly described as follows: The blank-disk A is applied to the chuck in the usual manner, and the handle 16 is then depressed in opposition to the spring 18 to move the rapidly-revolving centering-tool 19 into operative contact with the blank, thus turning a central recess or depression in the latter. The handle then being released, the centering-tool is retracted to its normal position by the action of said spring 18. This being done, the handle 34 is depressed, thus swinging the arm 24 forward. As the movement of the handle is continued the arm is moved longitudinally toward the blank through the instrumentality of the devices above described, the rapidly-revolving drill 27 thus piercing the blank within and eccentrically of the socket or recess. The pressure on the handle 34 is then slightly released, so as to permit the withdrawal of the drill from the blank, and thereupon the wheel 5 is turned one step, so as to present another portion of the blank to the drill, which is then advanced, as before, to pierce another hole in the blank. Thus the chuck is turned step by step and the drill is advanced and retracted until the requisite number of holes have been made in the blank. The now complete button is then removed from the chuck and another blank applied thereto preparatory to a repetition of the operation just described.

I wish it to be understood that my invention is not limited in its scope to the particular constructions and combinations of parts herein shown and described, as obviously the machine may be greatly altered and modified in many respects without departing from the fair spirit of the invention.

I claim—

1. In a button-making machine, the combination with a blank-holder, of mechanism movable axially toward and from said holder for turning a socket or depression in the blank, means for moving said mechanism into and out of operative position in respect to the blank, mechanism movable laterally and axially in respect to the holder for drilling a hole or holes in said blank, and means for moving the last-named mechanism into and out of operative position when the first-named mechanism is inactive, substantially as described.

2. In a button-making machine, the combination with a blank-holder, of a spindle provided with a turning-tool, means whereby said tool is rendered operative or inoperative in respect to the blank-holder, as desired, a shaft, a drill-support thereon, means for revolving the drill in said support, and means for moving said support laterally and longitudinally in respect to the blank-holder, substantially as described.

3. In a button-making machine, the combination with a blank-holder, of a spindle in alinement with said holder, provided with a turning-tool, means for longitudinally moving said spindle and tool toward and from the holder, a shaft, a drill-support thereon, means for revolving the drill in said support, and means for moving said support forward and shifting it longitudinally toward the blank-holder, substantially as described.

4. In a button-making machine, the combination with a blank-holder, of a shaft, means for driving the same, a sleeve on said shaft provided with an arm, a tool-holder on said arm, gearing between said tool-holder and the shaft, and means for partially turning and longitudinally moving said sleeve, substantially as described.

5. In a button-making machine, the combination with a blank-holder, of a shaft, means for driving the same, a sleeve on said shaft provided with a cam-surface and with an arm, a tool-holder on said arm, gearing between said tool-holder and the shaft, a cam on said shaft coöperating with the cam-surface on the sleeve, means for turning said cam and sleeve as a unit, a guide device, and means on the sleeve for coacting with said device to impart a longitudinal movement to said sleeve, substantially as described.

6. In a button-making machine, the combination with a blank-holder, of a shaft, means for driving the same, a sleeve on said shaft provided with a cam-surface and with an arm, a tool-holder on said arm, gearing between said tool-holder and the shaft, a cam on said shaft coöperating with the cam-surface on the sleeve, means for turning said cam and sleeve as a unit, a guide device, means on the sleeve for coacting with said device to impart a longitudinal movement to said sleeve, and means for returning said sleeve and cam to normal position, substantially as described.

7. In a button-making machine, the combination with a blank-holder, of a shaft, means for driving the same, a sleeve on said shaft provided with a cam-surface and with an arm, a tool-holder on said arm, gearing between said tool-holder and the shaft, a cam on said shaft coöperating with the cam-surface on the sleeve, means for turning said cam and sleeve as a unit, a vertically-adjustable guide-bracket, and means on the sleeve for coacting therewith to impart a longitudinal movement to said sleeve, substantially as described.

8. In a button-making machine, the combination with a blank-holder, of a shaft, means for driving the same, a sleeve on said shaft provided with a cam-surface and with an arm, a tool-holder on said arm, gearing between said tool-holder and the shaft, a cam on said shaft coöperating with the cam-surface on the sleeve, means for turning said cam and sleeve as a unit, and an adjustable stop for limiting the rotary movement of said cam, substantially as described.

In testimony whereof I have hereunto affixed my signature in the presence of two subscribing witnesses.

ABRAHAM GARBEIL. [L. S.]

Witnesses:
ANDREW V. GROUPE,
JOHN R. NOLAN.

It is hereby certified that the name of the assignee in Letters Patent No. 645,050, granted March 6, 1900, upon the application of Abraham Garbeil, of Philadelphia, Pennsylvania, for an improvement in "Machines for Making Buttons," was erroneously written and printed "Garbeil Bros.," whereas said name should have been written and printed *Garbeil Bros. Co.;* and that the said Letters Patent should be read with this correction therein that the same may conform to the record of the case in the Patent Office.

Signed, countersigned, and sealed this 13th day of March, A. D., 1900.

[SEAL.]

THOS. RYAN,
*First Assistant Secretary of the Interior.*

Countersigned:
C. H. DUELL,
*Commissioner of Patents.*